United States Patent
Hu et al.

(10) Patent No.: US 12,235,664 B2
(45) Date of Patent: Feb. 25, 2025

(54) CONTROL CIRCUIT WITH ENERGY REGULATION FOR VOLTAGE REGULATORS AND CONTROL METHOD THEREOF

(71) Applicant: Chengdu Monolithic Power Systems Co., Ltd., Chengdu (CN)

(72) Inventors: Wangmiao Hu, Hangzhou (CN); Fangyu Zhang, Hangzhou (CN); Lijie Jiang, Hangzhou (CN); Chao Liu, Sunnyvale, CA (US); Chiahsin Chang, Sammamish, WA (US); Jinghai Zhou, Saratoga, CA (US)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 237 days.

(21) Appl. No.: 18/170,757

(22) Filed: Feb. 17, 2023

(65) Prior Publication Data

US 2023/0205240 A1  Jun. 29, 2023

(30) Foreign Application Priority Data

Mar. 8, 2022 (CN) .......................... 202210219329.1

(51) Int. Cl.
  *G05F 1/46* (2006.01)
  *G05F 1/567* (2006.01)
  *H02M 3/156* (2006.01)
(52) U.S. Cl.
  CPC .............. *G05F 1/468* (2013.01); *G05F 1/567* (2013.01); *H02M 3/156* (2013.01)

(58) Field of Classification Search
  CPC ........ G05F 1/468; G05F 1/567; H02M 3/156; H02M 3/1582
  See application file for complete search history.

(56) References Cited

U.S. PATENT DOCUMENTS

| | | | |
|---|---|---|---|
| 8,395,368 B2 | 3/2013 | Ouyang | |
| 9,356,510 B2 | 5/2016 | Jiang et al. | |
| 9,473,027 B2* | 10/2016 | Dong | H02M 3/158 |
| 9,520,778 B2 | 12/2016 | Jiang et al. | |
| 10,348,197 B2 | 7/2019 | Liu et al. | |
| 10,498,234 B2* | 12/2019 | Liu | H02M 3/156 |
| 10,673,336 B2 | 6/2020 | Jiang et al. | |
| 10,756,621 B2 | 8/2020 | Xu et al. | |
| 10,951,116 B2 | 3/2021 | Liu et al. | |
| 11,043,896 B1 | 6/2021 | Ge et al. | |

\* cited by examiner

*Primary Examiner* — Adolf D Berhane
*Assistant Examiner* — Afework S Demisse
(74) *Attorney, Agent, or Firm* — Perkins Coie LLP

(57) ABSTRACT

A control circuit for a voltage regulator has an energy regulation circuit and a switching control circuit. The energy regulation circuit provides a regulation signal based on an output voltage, an output current, and a maximum energy reference. The maximum energy reference decreases with increasing of an ambient temperature and increases with decreasing of the ambient temperature. The switching control circuit provides a switching control signal based on the regulation signal to turn ON and turn OFF at least one switch of a plurality of switches of the voltage regulator, such that the output voltage and the output current satisfy a first relationship when the ambient temperature equals a first temperature value, and the output voltage and the output current satisfy a second relationship when the ambient temperature equals a second temperature value.

20 Claims, 8 Drawing Sheets

CONTROL CIRCUIT WITH ENERGY REGULATION FOR VOLTAGE REGULATORS AND CONTROL METHOD THEREOF

CROSS-REFERENCE TO RELATED APPLICATIONS

This application claims the benefit of CN application 202210219329.1, filed on Mar. 8, 2022, and incorporated herein by reference.

BACKGROUND OF THE INVENTION

1. Field of the Invention

The present invention generally relates to electronic circuits, and more particularly, relates to control circuits for voltage regulators and control methods thereof.

2. Description of Related Art

In power supplies for microprocessors with high current and low voltage, the power performance, especially the transient response is vital. To reduce voltage deviations of an output voltage (i.e., a power supply for microprocessors) during load transient, and to reduce power dissipation of the microprocessors when a load current increases, adaptive voltage position (AVP) control is widely used to insure the system stability.

The basic principle of traditional AVP control is shown in FIG. 1. An output voltage Vo decreases linearly from a voltage level V1 to a voltage level V2, as an output current Io (i.e. load current) increases from a minimum value (e.g., from zero Amps) to a maximum load point Im, wherein the voltage level V1 may be a reference voltage set according to a voltage identification code (VID) provided by a microprocessor.

Power dissipation increases rapidly with fast development of the microprocessors, which also brings problems of heat dissipation of the microprocessors. Thus, an improved voltage regulator with better power management is in high demand to help the microprocessors with thermal management.

SUMMARY OF THE INVENTION

Embodiments of the present invention are directed to a control circuit for a voltage regulator, comprising an energy regulation circuit, a voltage reference regulation circuit, and a switching control signal generating circuit. The voltage regulator is configured to provide an output voltage and an output current. The energy regulation circuit is configured to provide an output energy based on the output voltage and the output current, provide a maximum energy reference based on an ambient temperature, and provide a regulation signal based on the output energy and the maximum energy reference. The maximum energy reference is configured to decrease with increasing of the ambient temperature and increase with decreasing of the ambient temperature. The voltage reference regulation circuit is configured to receive the regulation signal, and provide an output voltage reference based on a target voltage and the regulation signal, wherein the output voltage reference varies with the regulation signal. The switching control signal generating circuit is configured to provide a switching control signal based on the output voltage reference and the output voltage to turn ON and turn OFF at least one switch of the voltage regulator.

Embodiments of the present invention are directed to a control circuit for a voltage regulator, comprising an energy regulation circuit and a switching control circuit. The voltage regulator is configured to provide an output voltage and an output current. The energy regulation circuit is configured to provide a regulation signal based on the output voltage, the output current, and a maximum energy reference. The maximum energy reference is configured to change reversely with an ambient temperature. The switching control circuit is configured to receive the regulation signal and provide a switching control signal based on the regulation signal to turn ON and turn OFF at least one switch of the voltage regulator, such that the output voltage and the output current satisfy a first relationship when the ambient temperature is equal to a first temperature value, and the output voltage and the output current satisfy a second relationship when the ambient temperature is equal to a second temperature value.

Embodiments of the present invention are directed to a control method for a voltage regulator. The voltage regulator is configured to provide an output voltage and an output current. The control method comprises providing an output energy based on the output voltage and the output current, providing a maximum energy reference based on an ambient temperature, wherein the maximum energy reference reversely changes with the ambient temperature, and providing a switching control signal based on the regulation signal to turn ON and turn OFF at least one switch of the voltage regulator. As a result, the output voltage and the output current satisfy a first relationship when the ambient temperature equals a first temperature value, and the output voltage and the output current satisfy a second relationship when the ambient temperature equals a second temperature value.

These and other features of the present invention will be readily apparent to persons of ordinary skill in the art upon reading the entirety of this disclosure, which includes the accompanying drawings and claims.

BRIEF DESCRIPTION OF DRAWINGS

The present invention can be further understood with reference to the following detailed description and the appended drawings, wherein like elements are provided with like reference numerals.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

A voltage regulator illustrated in the embodiments provides an output voltage and an output current for a load. A control circuit for the voltage regulator illustrated in the embodiments comprises an energy regulation circuit and a switching control circuit. The energy regulation circuit provides a regulation signal based on the output voltage, the output current and a maximum energy reference, wherein the maximum energy reference decreases with increasing of an ambient temperature and increases with decreasing of the ambient temperature. The switching control circuit generates a switching control signal based on the regulation signal to turn ON and turn OFF at least one switch of the voltage regulator, such that the output voltage and the output current satisfy a first relationship when the ambient temperature is equal to a first temperature value, and the output voltage and the output current satisfy a second relationship when the ambient temperature is equal to a second temperature value. In one embodiment, the first relationship comprises that the output voltage and the output current vary along a first curve, and the second relationship comprises that the output voltage and the output current vary along a second curve. The control circuit can easily realize reliable energy management from the voltage regulator side, and can further ensure safe operation of the load while continuously providing the load with high-power energy.

Figure 1:
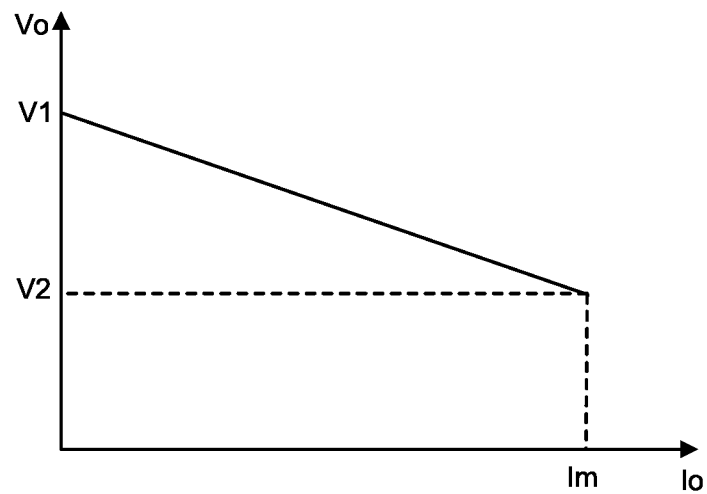
FIG. 1 schematically shows a basic principle of traditional adaptive voltage position (AVP) control.
Figure 2:
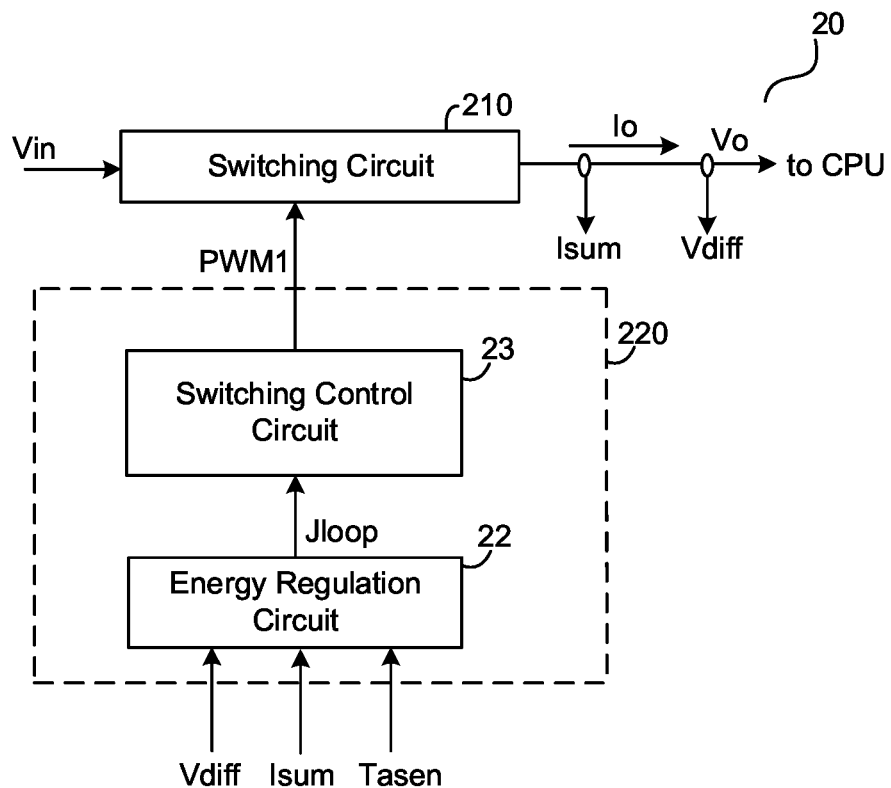
FIG. 2 schematically shows a voltage regulator 20 in accordance with an embodiment of the present invention.

FIG. 2 schematically shows a voltage regulator 20 in accordance with an embodiment of the present invention. The voltage regulator 20 provides an output voltage Vo and an output current Io for the load. The load of the voltage regulator 20 may be but not be limited to a central processing unit (CPU), a graphics processing unit (GPU), etc. The load may adjust its operating frequency based on its junction temperature, and send out a command to change the output voltage Vo of the voltage regulator 20, but the response is slow. To suppress power dissipation before an over temperature event of the load occurs, the voltage regulator 20 actively regulates the output voltage Vo, the output current Io, or an output power Pload before the load sends out the command to change the output voltage Vo of the voltage regulator 20, and thus realizes energy management ahead of time.

In the embodiment of FIG. 2, the voltage regulator 20 comprises a switching circuit 210 and a control circuit 220. The switching circuit 210 may be a buck circuit, a boost circuit, a buck-boost circuit, or any other suitable circuit topology. The control circuit 220 comprises an energy regulation circuit 22 and a switching control circuit 23. As shown in FIG. 2, the energy regulation circuit 22 receives a voltage sensing signal Vdiff representative of the output voltage Vo, a current sensing signal Isum representative of the output current Io, and a temperature sensing signal Tasen representative of an ambient temperature Ta, and provides a regulation signal Jloop based on the output voltage Vo, the output current Io and the ambient temperature Ta to adjust an output energy Jout of the voltage regulator 20 within a time period. In one embodiment, the energy regulation circuit 22 generates a maximum energy reference Jmax based on the ambient temperature Ta, and provides the regulation signal Jloop based on the output voltage Vo, the output current Io and the maximum energy reference Jmax, wherein the maximum energy reference Jmax reversely changes with the ambient temperature Ta. For example, the maximum energy reference Jmax decreases with increasing of the ambient temperature Ta, and increases with decreasing of the ambient temperature Ta. In one embodiment, the temperature sensing signal Tasen may be but not be limited to the ambient temperature sampled by the control circuit 220, a junction temperature of an integrated circuit (IC) where the control circuit 220 is located, the ambient temperature sampled by the load (e.g., a case temperature, a heatsink temperature, etc.), or the ambient temperature sampled by another power management IC (e.g., a junction temperature, a case temperature, or a heatsink temperature of the power management IC, etc.). The temperature sampled by the load or by another power management IC may be sent to the control circuit 220 via a communication bus.

The switching control circuit 23 is coupled to the energy regulation circuit 22 to receive the regulation signal Jloop. The switching control circuit 23 generates a switching control signal PWM1 based on the regulation signal Jloop to turn ON and turn OFF at least one switch of the switching circuit 210, such that the output voltage Vo and the output current Io satisfy a first relationship when the ambient temperature Ta equals the first temperature value, and the output voltage Vo and the output current Io satisfy a second relationship when the ambient temperature Ta equals the second temperature value. In one embodiment, the voltage regulator 20 comprises a voltage control state to regulate the output voltage Vo and a power control state to regulate an output power, when the voltage regulator 20 operates in the power control state and when the second temperature value is larger than the first temperature value, a product of the output voltage Vo and the output current Io under the second relationship is smaller than the product of the output voltage Vo and the output current Io under the first relationship.

Figure 3A:
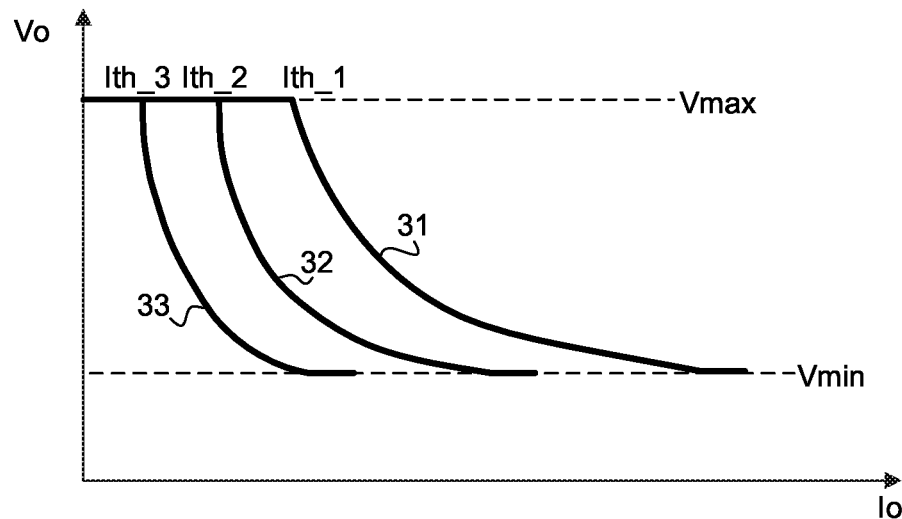
FIGS. 3A-3C show curves 31-33 of an output voltage Vo versus an output current Io in accordance with an embodiment of the present invention.
Figure 3B:
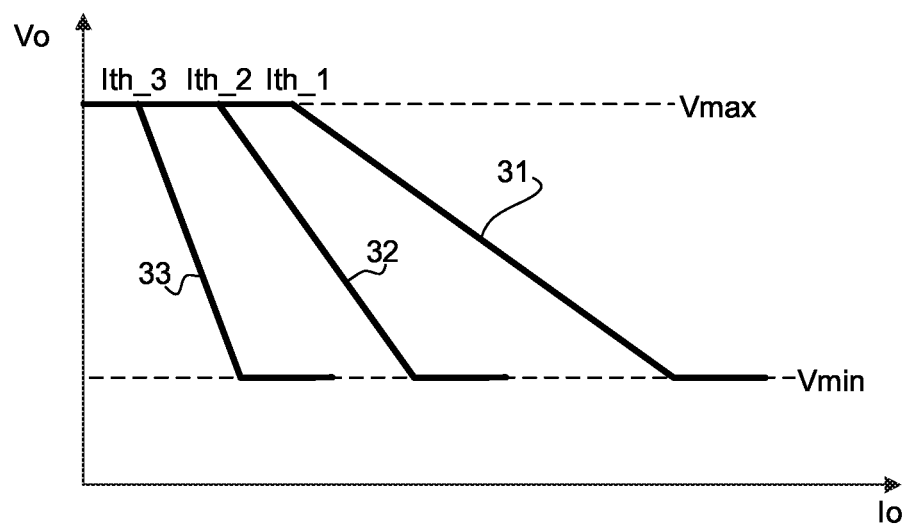
Figure 3C:
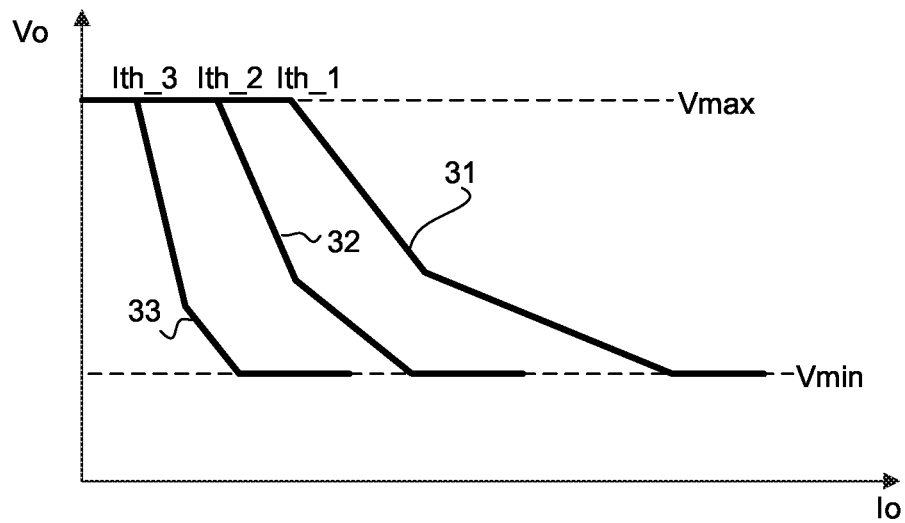

FIGS. 3A-3C show curves 31-33 of the output voltage Vo versus the output current Io in accordance with an embodiment of the present invention, wherein the vertical axis represents the output voltage Vo, and the horizontal axis represents the output current Io. The curve 31 shows the output voltage Vo and the output current Io which satisfy the first relationship when the ambient temperature Ta equals the first temperature value (e.g., 25° C.), the curve 32 shows the output voltage Vo and the output current Io which satisfy the second relationship when the ambient temperature Ta equals the second temperature value (e.g., 50° C.), and the curve 33 shows the output voltage Vo and the output current Io which satisfy the third relationship when the ambient temperature Ta equals the third temperature value (e.g., 75° C.). One with ordinary skill in the art should understand that the curves of the output voltage Vo versus the output current Io are not limited by the curves 31-33 shown in FIGS. 3A-3C. For example, more curves of the output voltage Vo versus the output current Io under different ambient temperatures may be included, and curves of the output voltage Vo versus the output current Io may comprise other shapes different from the curves 31-33 shown in FIGS. 3A-3C.

In one embodiment, when the output current Io is smaller than a current threshold Ith, the voltage regulator 20 operates in the voltage control state, for example, controlling the output voltage Vo constant or equal to a programmable voltage reference. When the output current Io is larger than the current threshold Ith, the voltage regulator 20 operates in the power control state, for example, controlling the output power Pload constant or equal to a programmable power reference. During the power control state, the output voltage Vo decreases with increasing of the output current Io. Until the output voltage Vo decreases to a minimum voltage threshold Vmin, the voltage regulator 20 operates in the voltage control state again, for example, controlling the output voltage Vo equal to the minimum voltage threshold Vmin. The current threshold Ith decreases with increasing of the ambient temperature Ta, and increases with decreasing of the ambient temperature Ta. In the example of FIG. 3A, when the ambient temperature Ta is equal to the first temperature value (refer to the curve 31), if the output current Io is smaller than a current threshold Ith_1, then the output voltage Vo is controlled constant (e.g., equal to a maximum target voltage Vmax), and if the output current Io is larger than the current threshold Ith_1, then the product of the output voltage Vo and the output current Io (Vo*Io, i.e., the output power Pload) is controlled equal to a first power P1 (e.g., 750 W). When the ambient temperature Ta is equal to the second temperature value (refer to the curve 32), if the output current Io is smaller than a current threshold Ith_2, then the output voltage Vo is controlled constant (e.g., equal to the maximum target voltage Vmax), and if the output current Io is larger than the current threshold Ith_2, then the product of the output voltage Vo and the output current Io (Vo*Io) is controlled equal to a second power P2 (e.g., 500 W). When the ambient temperature Ta is equal to a third temperature value (refer to the curve 33), if the output current Io is smaller than a current threshold Ith_3, then the output voltage Vo is controlled constant (e.g., equal to the maximum target voltage Vmax), and if the output current Io is larger than the current threshold Ith_3, then the product of the output voltage Vo and the output current Io (Vo*Io) is controlled equal to a third power P3 (e.g., 250 W). In the examples of FIGS. 3B-3C, with different ambient temperatures Ta, if the output current Io is larger than the corresponding current threshold Ith, the output voltage Vo varies along the curves 31-33 fitted by multiple straight lines as the output current Io increases.

Figure 4:
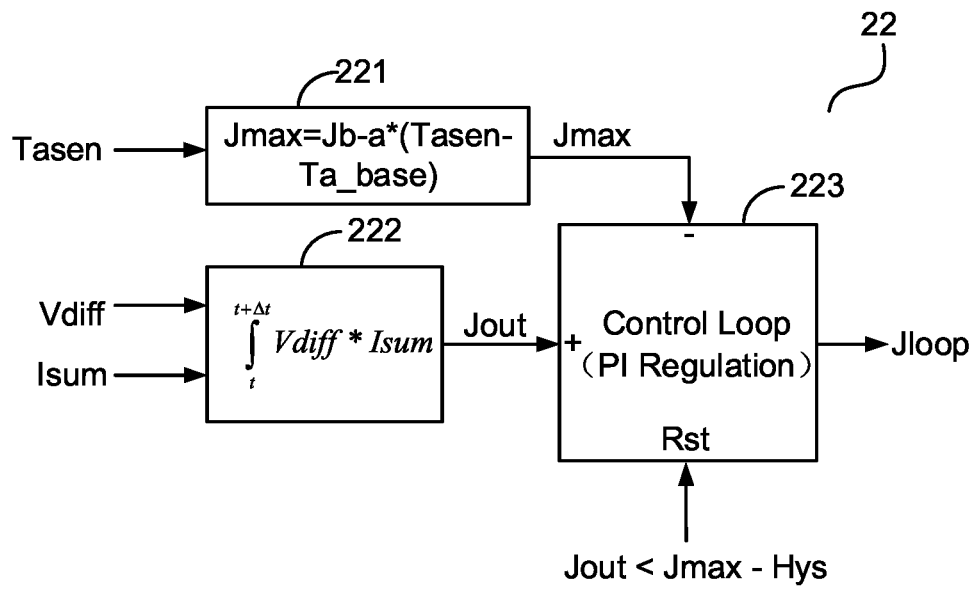
FIG. 4 schematically shows an energy regulation circuit 22 in accordance with an embodiment of the present invention.

FIG. 4 schematically shows the energy regulation circuit 22 in accordance with an embodiment of the present invention. The energy regulation circuit 22 generates the output energy Jout based on the output voltage Vo and the output current Io, and generates the maximum energy reference Jmax based on the ambient temperature Ta. The maximum energy reference Jmax decreases with increasing of the ambient temperature Ta, and increases with decreasing of the ambient temperature Ta. The energy regulation circuit 22 further generates the regulation signal Jloop based on the output energy Jout and the maximum energy reference Jmax. In one embodiment, the energy regulation circuit 22 may generate the output energy Jout by integrating the product of the output voltage Vo and the output current Io within a certain time period.

As shown in FIG. 4, the energy regulation circuit 22 comprises a calculation circuit 221, an integral circuit 222, and a control loop 223. One with ordinary skill in the art should understand that the detailed circuit structure of the energy regulation circuit 22 is not limited by the example shown in FIG. 4. The calculation circuit 221 receives the temperature sensing signal Tasen, and generates the maximum energy reference Jmax based on the temperature sensing signal Tasen and a preset maximum energy reference Jb. For example, the maximum energy reference Jmax may be generated based on but not limited to a following formula (1), wherein "a" is a coefficient, and Ta_base is a temperature reference. In one example, the preset maximum energy reference Jb may be written via the communication bus, or be preset. The preset maximum energy reference Jb is the maximum energy reference Jmax when the temperature sensing signal Tasen equals the temperature reference Ta_base.

$$J\max = Jb - a*(\text{Tasen} - Ta\_\text{base}) \quad (1)$$

The integral circuit 222 receives the voltage sensing signal Vdiff and the current sensing signal Isum, and generates the output energy Jout based on, for example, a following formula (2), i.e., generating the output energy Jout by integrating a product of the voltage sensing signal Vdiff and the current sensing signal Isum in a time period Δt. The integral circuit 222 may be realized using an analog circuit or a digital circuit.

$$J\text{out} = \int_t^{t+\Delta t} V\text{diff}*I\text{sum} \quad (2)$$

The control loop 223 receives the output energy Jout and the maximum energy reference Jmax, and generates the regulation signal Jloop based on the output energy Jout and the maximum energy reference Jmax. As an example and not by way of limitation, a difference between the output energy Jout and the maximum energy reference Jmax (Jout-Jmax) is loop regulated, e.g., is proportional integral (PI) regulated.

In one embodiment, when the output energy Jout is smaller than a regulation threshold, the control loop 223 is reset, and the regulation signal Jloop is default (e.g., zero). In other words, the regulation signal stops regulating the switching control signal in response to the output energy Jout being smaller than the regulation threshold. The regulation threshold is smaller than or equal to the maximum energy reference Jmax. For example, the regulation threshold may be equal to the maximum energy reference Jmax minus a hysteresis Hys (Jmax-Hys). The hysteresis Hys provides an opposite regulation with the loop regulation (e.g., the PI regulation and so on), which makes it easier to find a stable quiescent point for the regulation signal Jloop and thus improves the stability of the system.

Figure 5:
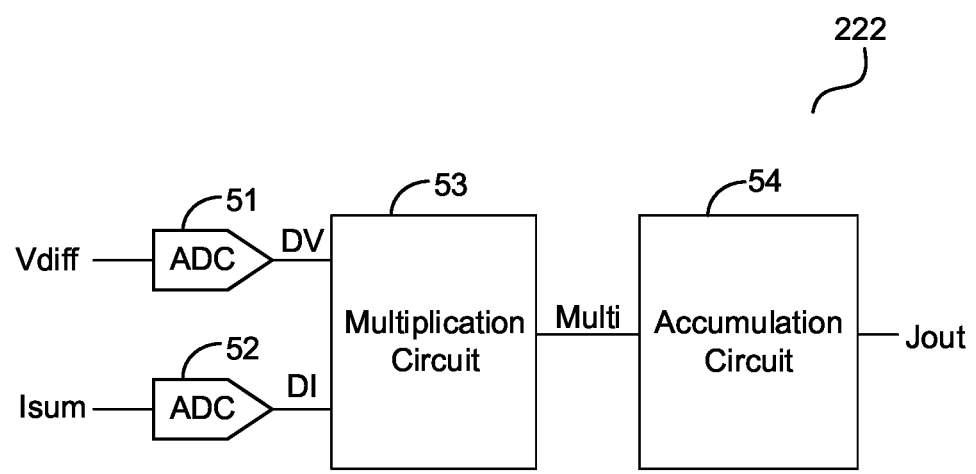
FIG. 5 schematically shows an integral circuit 222 in accordance with an embodiment of the present invention.

FIG. 5 schematically shows the integral circuit 222 in accordance with an embodiment of the present invention. In the example of FIG. 5, the integral circuit 222 is a digital circuit for illustration, and one with ordinary skill in the art should understand that the detailed circuit structure of the integral circuit 222 is not limited by the example shown in FIG. 5. In the example of FIG. 5, an analog-digital converter 51 receives the voltage sensing signal Vdiff, and provides a digital signal DV via analog to digital conversion, and an analog-digital converter 51 receives the current sensing signal Isum, and provides a digital signal DI via analog to digital conversion. A multiplication circuit 53 receives the digital signal DV and the digital signal DI, and provides a signal Multi. In one embodiment, the multiplication circuit 53 may be realized using adders. An accumulation circuit 54 receives the signal Multi, and generates the output energy Jout by accumulating the signal Multi within a certain time period.

Figure 6:
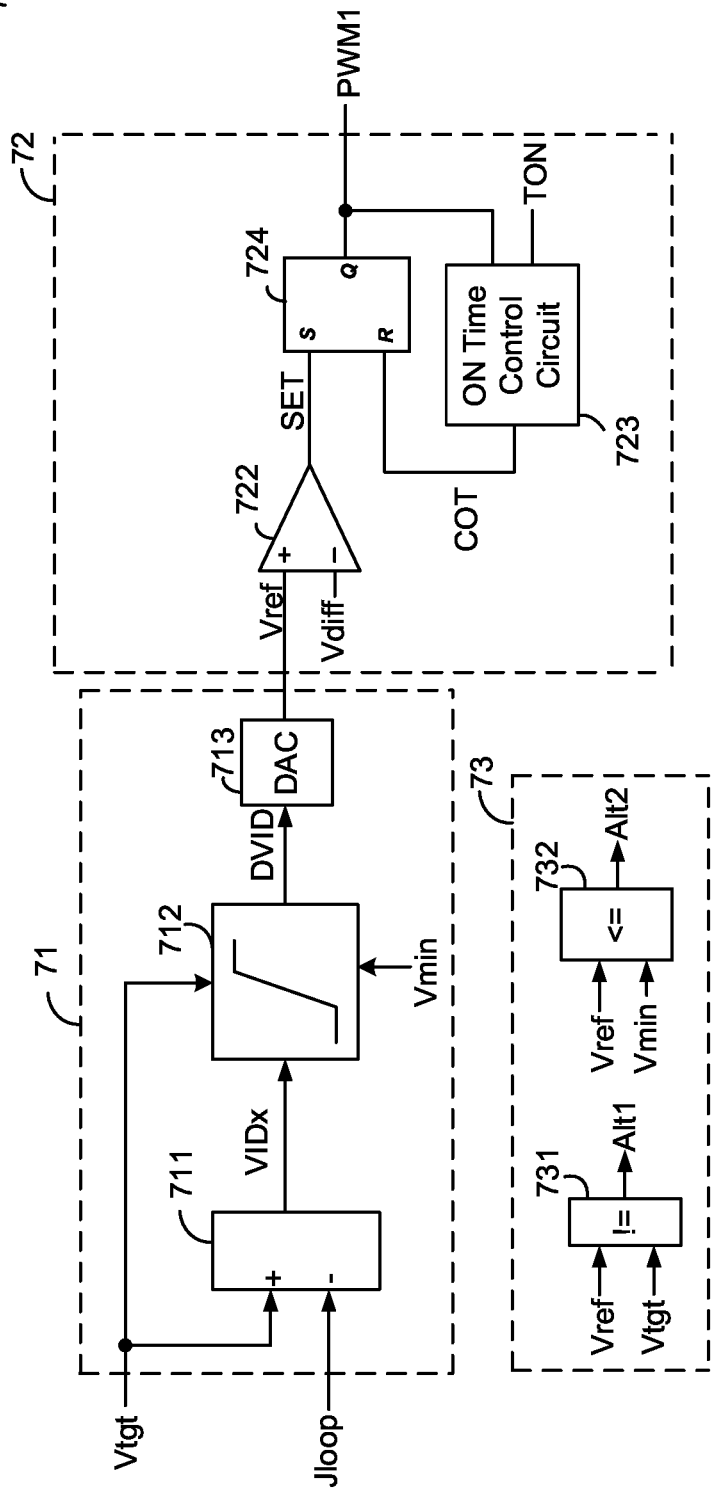
FIG. 6 schematically shows a switching control circuit 23 in accordance with an embodiment of the present invention.

FIG. 6 schematically shows the switching control circuit 23 in accordance with an embodiment of the present invention. As shown in FIG. 6, the switching control circuit 23 comprises a voltage reference regulation circuit 71, a switching control signal generating circuit 72, and an alert circuit 73.

The voltage reference regulation circuit 71 receives the regulation signal Jloop, and provides an output voltage reference Vref based on a target voltage Vtgt and the regulation signal Jloop, wherein the output voltage reference Vref is used to set the output voltage Vo, and the output voltage reference Vref changes dynamically with the change of the regulation signal Jloop. In one embodiment, the target voltage Vtgt may be written via the communication bus, be set by passive devices, be set by a voltage identification code VID which is provided by the load, or be preset. In one embodiment, the regulation signal Jloop stops regulating the output voltage reference Vref in response to the output energy Jout being smaller than the regulation threshold. As shown in FIG. 6, the voltage reference regulation circuit 71 comprises a subtracting circuit 711, a clipper circuit 712, and a digital-analog converting circuit 713. The subtracting circuit 711 receives the target voltage Vtgt and the regulation signal Jloop, and provides a difference value VIDx between the target voltage Vtgt and the regulation signal Jloop, wherein the difference value VIDx is equal to the target voltage Vtgt minus the regulation signal Jloop (Vtgt-Jloop). The clipper circuit 712 receives the difference value VIDx, and provides a dynamic voltage reference signal DVID by clipping the difference value VIDx. In one embodiment, the clipper circuit 712 controls the output voltage reference Vref to not be larger than the target voltage Vtgt by limiting a maximum value of the dynamic voltage reference signal DVID based on the target voltage Vtgt, and controls the output voltage reference Vref to not be smaller than the minimum voltage threshold Vmin by limiting the minimum value of the dynamic voltage reference signal DVID based on the minimum voltage threshold Vmin. The digital-analog converting circuit 713 converts the dynamic voltage reference signal DVID to generate the output voltage reference Vref.

The switching control signal generating circuit 72 generates the switching control signal PWM1 based on the output voltage reference Vref and the output voltage Vo to turn ON and turn OFF the at least one switch of the switching circuit 210. The embodiment of FIG. 6 employs constant ON time control as an example, and one with ordinary skill in the art should understand that other control methods, e.g., peak current mode control, may also be used in the present invention. As shown in FIG. 6, when the voltage sensing signal Vdiff is smaller than the output voltage reference Vref, a comparison signal SET is active so that the at least one switch of the switching circuit 210 is turned ON by the switching control signal PWM1, and the at least one switch is turned OFF by the switching control signal PWM1 when an ON time period of the at least one switch reaches a preset time period. In the example of FIG. 6, the switching control signal generating circuit 72 comprises a comparison circuit 722, an ON time control circuit 723 and a logic circuit 724. A non-inverting input terminal of the comparison circuit 722 receives the output voltage reference Vref, an inverting input terminal of the comparison circuit 722 receives the voltage sensing signal Vdiff, and the comparison signal SET is provided at an output terminal of the comparison circuit 722 by comparing the output voltage reference Vref with the voltage sensing signal Vdiff. The ON time control circuit 723 provides an ON time control signal COT based on the switching control signal PWM1 and an ON time signal TON. The logic circuit 724 receives the comparison signal SET and the ON time control signal COT, and provides the switching control signal PWM1 based on the comparison signal SET and the ON time control signal COT. For example, the logic circuit 724 may be an RS flip-flop.

The alert circuit 73 provides an alert signal Alt1 and an alert signal Alt2. When the output voltage reference Vref is different with the target voltage Vtgt, the alert signal Alt1 indicates that the output energy is being regulated. When the output voltage reference Vref is equal to the minimum voltage threshold Vmin, the alert signal Alt2 indicates that a regulation of the voltage regulator 20 has reached an upper limit.

Figure 7:
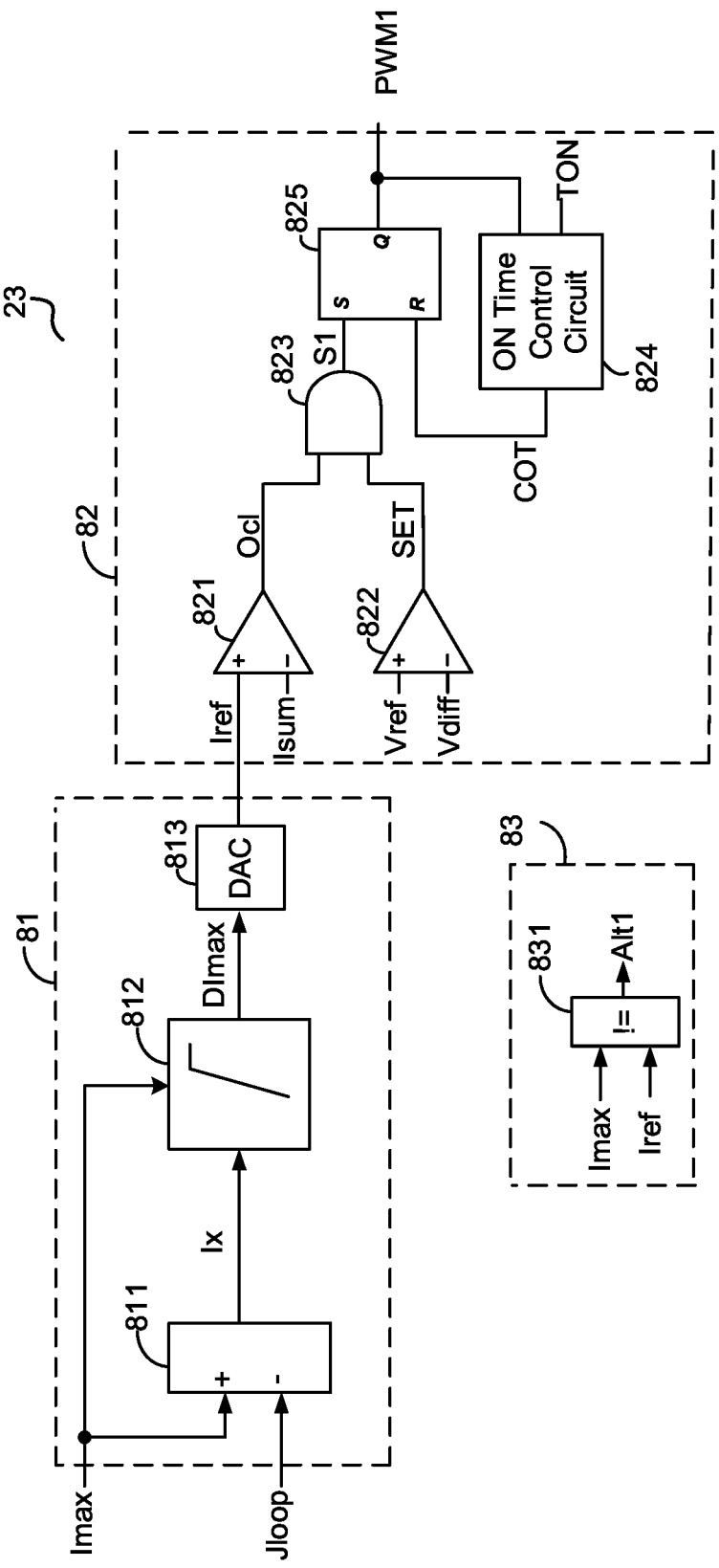
FIG. 7 schematically shows the switching control circuit 23 in accordance with another embodiment of the present invention.

FIG. 7 schematically shows the switching control circuit 23 in accordance with another embodiment of the present invention. As shown in FIG. 7, the switching control circuit 23 comprises a current reference regulation circuit 81, a switching control signal generating circuit 82, and an alert circuit 83.

The current reference regulation circuit 81 receives a maximum target current Imax and the regulation signal Jloop, and provides a maximum output current reference Iref based on the maximum target current Imax and the regulation signal Jloop. The maximum output current reference Iref is employed to set a maximum value of the output current Io, and the maximum output current reference Iref changes dynamically with the regulation signal Jloop. In one embodiment, the maximum target current Imax may be written via the communication bus, or be preset. As shown in FIG. 7, the current reference regulation circuit 81 comprises a subtracting circuit 811, a clipper circuit 812, and a digital-analog converting circuit 813. The subtracting circuit 811 receives the maximum target current Imax and the regulation signal Jloop, and provides a difference value Ix between the maximum target current Imax and the regulation signal Jloop, wherein the difference value Ix is equal to the maximum target current Imax minus the regulation signal Jloop (Imax−Jloop). The clipper circuit 812 receives the difference value Ix, and provides a dynamic output current reference signal DImax by clipping the difference value Ix. In one embodiment, the clipper circuit 812 controls the maximum output current reference Iref to not be larger than the maximum target current Imax by limiting the maximum value of the dynamic output current reference signal DImax based on the maximum target current Imax. The digital-analog converting circuit 813 receives the dynamic output current reference signal DImax and provides the maximum output current reference Iref via digital to analog conversion.

The switching control signal generating circuit 82 generates the switching control signal PWM1 based on the output voltage reference Vref, the maximum output current reference Iref, the current sensing signal Isum, and the voltage sensing signal Vdiff to turn ON and turn OFF the at least one switch of the switching circuit 210. In one example, the output voltage reference Vref may be generated based on the target voltage Vtgt. The embodiment of FIG. 7 employs constant ON time control as an example, and one with ordinary skill in the art should understand that other control methods, e.g., peak current mode control, may also be used in the present invention. As shown in FIG. 7, when the voltage sensing signal Vdiff is smaller than the output voltage reference Vref and the current sensing signal Isum is smaller than the maximum output current reference Iref, a set signal S1 is active so that the at least one switch of the switching circuit 210 is turned ON by the switching control signal PWM1, and the at least one switch is turned OFF by the switching control signal PWM1 when the ON time period of the at least one switch reaches a preset time period. One with ordinary skill in the art should understand that the control scheme of the output current Io is not limited by the circuit structure shown in FIG. 7, and may also comprise any other suitable circuit structures which are not departed from the spirit and the scope of the present invention. In the example of FIG. 7, the switching control signal generating circuit 82 comprises a comparison circuit 821, a comparison circuit 822, a logic circuit 823, an ON time control circuit 824 and a logic circuit 825. A non-inverting input terminal of the comparison circuit 821 receives the maximum output current reference Iref, an inverting input terminal of the comparison circuit 821 receives the current sensing signal Isum, and a comparison signal Ocl is provided at an output terminal of the comparison circuit 821 by comparing the maximum output current reference Iref and the current sensing signal Isum. A non-inverting input terminal of the comparison circuit 822 receives the output voltage reference Vref, an inverting input terminal of the comparison circuit 822 receives the voltage sensing signal Vdiff, and an output terminal of the comparison circuit 822 provides the comparison signal SET by comparing the output voltage reference Vref and the voltage sensing signal Vdiff. The logic circuit 823 provides the set signal S1 based on the comparison signal SET and the comparison signal Ocl. In one embodiment, the logic circuit 823 comprises an AND gate, wherein a first input terminal of the AND gate receives the comparison signal Ocl, a second input terminal of the AND gate receives the comparison signal SET, and the set signal S1 is provided at an output terminal of the AND gate. The ON time control circuit 824 provides an ON time control signal COT based on the switching control signal PWM1 and an ON time signal TON. The logic circuit 825 receives the set signal S1 and the ON time control signal COT, and provides the switching control signal PWM1 based on the set signal S1 and the ON time control signal COT. For example, the logic circuit 825 may comprise an RS flip-flop.

The alert circuit 83 provides the alert signal Alt1 based on the maximum output current reference Iref. When the maximum output current reference Iref is different with the maximum target current Imax, the alert signal Alt1 indicates that the output energy is being regulated.

Figure 8:
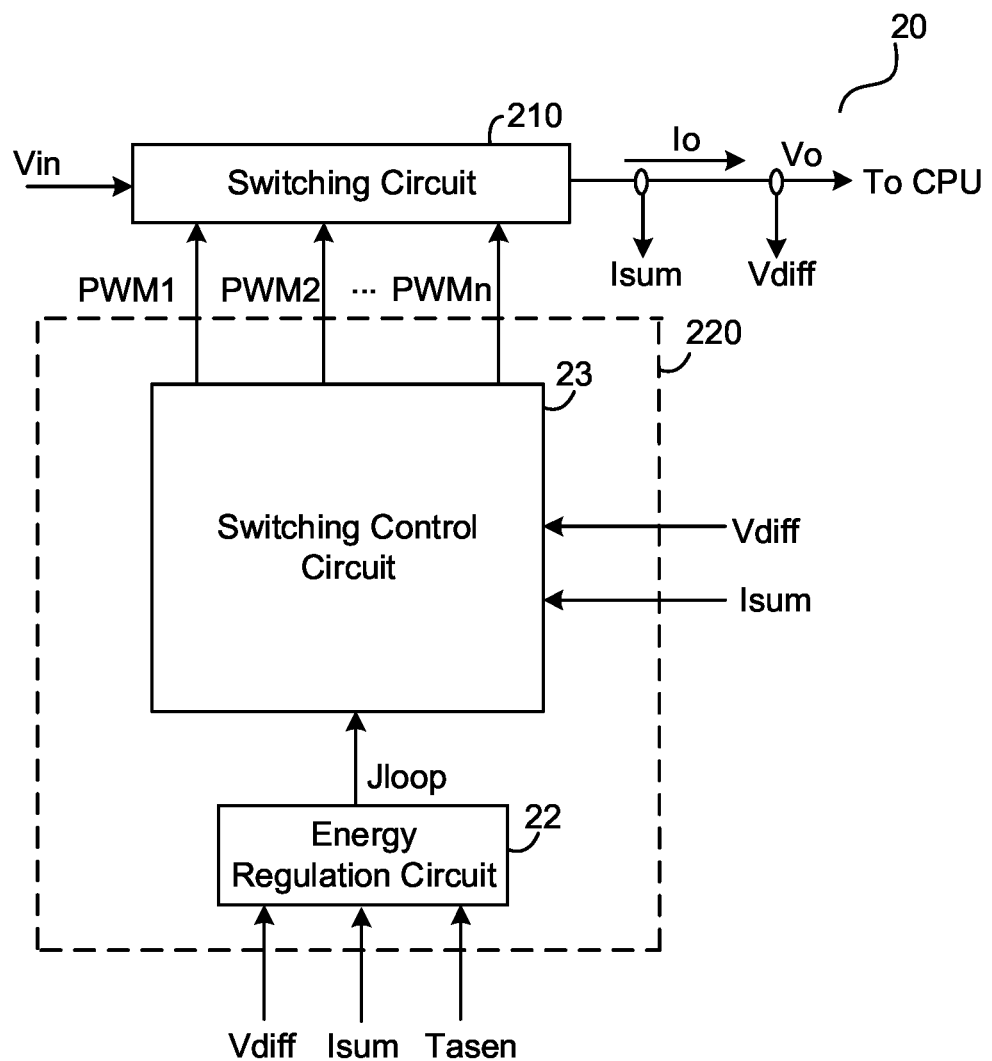
FIG. 8 schematically shows the voltage regulator 20 in accordance with another embodiment of the present invention.

FIG. 8 schematically shows the voltage regulator 20 in accordance with another embodiment of the present invention. In one embodiment, the switching circuit 210 comprises a plurality of phases, and the switching control circuit 23 generates a plurality of switching control signals PWM1, PWM2, . . . , and PWMn based on the regulation signal Jloop, the output voltage Vo and the output current Io, and thus successively turns ON and turns OFF the at least one switch of each phase of the switching circuit 210.

Figure 9:
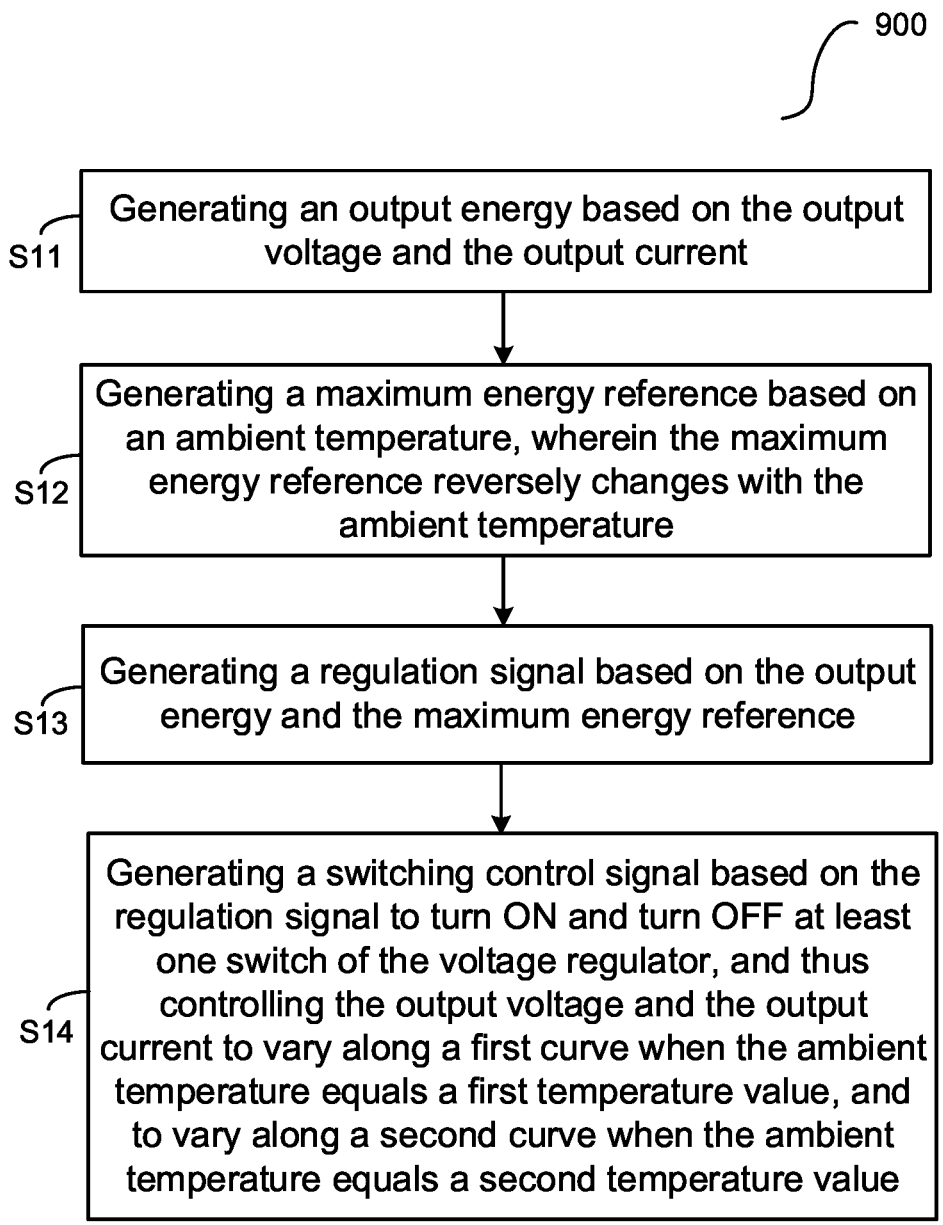
FIG. 9 illustrates a control method 900 for a voltage regulator in accordance with an embodiment of the present invention.

FIG. 9 illustrates a control method 900 for a voltage regulator in accordance with an embodiment of the present invention, wherein the control method 900 comprises steps S11-S14. The voltage regulator provides an output voltage and an output current for a load.

In step S11, generating an output energy based on the output voltage and the output current.

In step S12, generating a maximum energy reference based on an ambient temperature, wherein the maximum energy reference reversely changes with the ambient temperature.

In step S13, generating a regulation signal based on the output energy and the maximum energy reference.

In step S14, generating a switching control signal based on the regulation signal to turn ON and turn OFF at least one switch of the voltage regulator, and thus controlling the output voltage and the output current to vary along a first curve when the ambient temperature equals a first temperature value, and to vary along a second curve when the ambient temperature equals a second temperature value. In other words, the output voltage and the output current satisfy the first relationship when the ambient temperature equals a first temperature value, and varies the second curve when the ambient temperature equals a second temperature value. Wherein the operation of the voltage regulator comprises a voltage control state to regulate the output voltage and a power control state to regulate an output power. When the second temperature value is larger than the first temperature value and the voltage regulator operates in the power control state, a product of the output voltage Vo and the output current Io which vary along the second curve is smaller than the product of the output voltage Vo and the output current Io which vary along the first curve.

In one embodiment, generating the switching control signal based on the regulation signal further comprises generating an output voltage reference based on a target voltage and the regulation signal, and generating the switching control signal based on the output voltage reference and the output voltage to turn ON and turn OFF the at least one switch of the switching circuit, wherein the output voltage reference changes dynamically with the regulation signal.

In another embodiment, generating the switching control signal based on the regulation signal further comprises generating a maximum output current reference based on a maximum target current and the regulation signal, and generating the switching control signal based on the target voltage, the maximum output current reference, the output voltage and the output current to turn ON and turn OFF the at least one switch of the switching circuit, wherein the maximum output current reference changes dynamically with the regulation signal.

Note that in the flowchart described above, the functions indicated in the boxes can also occur in a different order than those shown in FIG. 9. Fox example, two boxes presented one after another can actually be executed essentially at the same time, or sometimes in reverse order, depending on the specific functionality involved.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

The invention claimed is:

1. A control circuit for a voltage regulator, wherein the voltage regulator has a plurality of switches and is configured to provide an output voltage and an output current, the control circuit comprising:
an energy regulation circuit, configured to provide an output energy based on the output voltage and the output current, and to provide a maximum energy reference based on an ambient temperature, and to provide a regulation signal based on the output energy and the maximum energy reference, wherein the maximum energy reference is configured to decrease with increasing of the ambient temperature and to increase with decreasing of the ambient temperature;
a voltage reference regulation circuit, configured to receive the regulation signal, and to provide an output voltage reference based on a target voltage and the regulation signal, wherein the output voltage reference varies with the regulation signal; and
a switching control signal generating circuit, configured to provide a switching control signal based on the output voltage reference and the output voltage to turn ON and turn OFF at least one switch of the plurality of switches of the voltage regulator.

2. The control circuit of claim 1, wherein the energy regulation circuit is configured to provide the output energy by integrating a product of the output voltage and the output current within a time period.

3. The control circuit of claim 1, wherein the energy regulation circuit comprises:
a calculation circuit, configured to provide the maximum energy reference based on a preset maximum energy reference and the ambient temperature;
an integral circuit, configured to receive a voltage sensing signal representative of the output voltage and a current sensing signal representative of the output current, and configured to provide the output energy by integrating a product of the voltage sensing signal and the current sensing signal within a time period; and
a control loop, configured to receive the output energy and the maximum energy reference, and configured to provide the regulation signal based on the output energy and the maximum energy reference.

4. The control circuit of claim 1, wherein the regulation signal stops regulating the output voltage reference in response to the output energy being smaller than a regulation threshold, and wherein the regulation threshold is smaller than or equal to the maximum energy reference.

5. The control circuit of claim 1, wherein the voltage reference regulation circuit further comprises:
a clipper circuit, configured to limit the output voltage reference between the target voltage and a minimum voltage threshold, wherein the minimum voltage threshold is smaller than the target voltage.

6. The control circuit of claim 1, further comprising:
an alert circuit, configured to provide a first alert signal and a second alert signal based on the output voltage reference; wherein
when the output voltage reference is different with the target voltage, the first alert signal is configured to indicate that the output energy is being regulated; and
when the output voltage reference is equal to the minimum voltage threshold, the second alert signal is configured to indicate that a regulation of the output energy reaches an upper limit.

7. The control circuit of claim 1, wherein the output voltage and the output current satisfy a first relationship when the ambient temperature is equal to a first temperature value, and the output voltage and the output current satisfy a second relationship when the ambient temperature is equal to a second temperature value.

8. The control circuit of claim 7, wherein the voltage regulator is configured to operate in a voltage control state to regulate the output voltage and a power control state to regulate an output power, when the voltage regulator operates in the power control state and the second temperature value is larger than the first temperature value, a product of the output voltage and the output current satisfying the second relationship is smaller than the product of the output voltage and the output current satisfying the first relationship.

9. A control circuit for a voltage regulator, wherein the voltage regulator has a plurality of switches and is configured to provide an output voltage and an output current, the control circuit comprising:
an energy regulation circuit, configured to provide a regulation signal based on the output voltage, the output current, and a maximum energy reference, wherein the maximum energy reference is configured to change reversely with an ambient temperature; and
a switching control circuit, configured to receive the regulation signal and provide a switching control signal based on the regulation signal to turn ON and turn OFF at least one switch of the plurality of switches of the voltage regulator, such that the output voltage and the output current satisfy a first relationship when the ambient temperature is equal to a first temperature value, and the output voltage and the output current satisfy a second relationship when the ambient temperature is equal to a second temperature value.

10. The control circuit of claim 9, wherein the voltage regulator is configured to operate in a voltage control state to regulate the output voltage and a power control state to regulate an output power, when the voltage regulator operates in the power control state and the second temperature value is larger than the first temperature value, a product of the output voltage and the output current satisfying the second relationship is smaller than the product of the output voltage and the output current satisfying the first relationship.

11. The control circuit of claim 9, wherein the energy regulation circuit comprises:
a calculation circuit, configured to calculate the maximum energy reference based on a preset maximum energy reference and a temperature sensing signal representative of the ambient temperature;
an integral circuit, configured to receive a voltage sensing signal representative of the output voltage and a current sensing signal representative of the output current, and configured to provide the output energy by integrating a product of the voltage sensing signal and the current sensing signal within a time period; and
a control loop, configured to receive the output energy and the maximum energy reference, and configured to provide the regulation signal based on the output energy and the maximum energy reference.

12. The control circuit of claim 11, wherein the regulation signal stops regulating the switching control signal in response to the output energy being smaller than a regulation threshold, and wherein the regulation threshold is smaller than or equal to the maximum energy reference.

13. The control circuit of claim 9, wherein the switching control circuit comprises:
  a voltage reference regulation circuit, configured to receive the regulation signal, and provide an output voltage reference based on a target voltage and the regulation signal, wherein the output voltage reference varies with the regulation signal; and
  a switching control signal generating circuit, configured to provide a switching control signal based on the output voltage reference and the output voltage.

14. The control circuit of claim 9, wherein the switching control circuit comprises:
  a current reference regulation circuit, configured to receive the regulation signal, and provide a maximum output current reference based on a maximum target current and the regulation signal, wherein the maximum output current reference varies with the regulation signal; and
  a switching control signal generating circuit, configured to provide a switching control signal based on an output voltage reference, the maximum output current reference, the output voltage and the output current.

15. A control method for a voltage regulator, wherein the voltage regulator has a plurality of switches and is configured to provide an output voltage and an output current, the control method comprising:
  providing an output energy based on the output voltage and the output current;
  providing a maximum energy reference based on an ambient temperature, wherein the maximum energy reference reversely changes with the ambient temperature;
  providing a regulation signal based on the output energy and the maximum output energy; and
  providing a switching control signal based on the regulation signal to turn ON and turn OFF at least one switch of the plurality of switches of the voltage regulator, such that the output voltage and the output current satisfy a first relationship when the ambient temperature equals a first temperature value, and the output voltage and the output current satisfy a second relationship when the ambient temperature equals a second temperature value.

16. The control method of claim 15, wherein:
  when the output current is smaller than a current threshold, the voltage regulator operates in a voltage control state to regulate the output voltage; and
  when the output current is larger than the current threshold, the voltage regulator operates in a power control state to regulate an output power.

17. The control method of claim 15, wherein the voltage regulator is controlled to operate in a voltage control state to regulate the output voltage and a power control state to regulate an output power, when the voltage regulator operates in the power control state and the second temperature value is larger than the first temperature value, a product of the output voltage and the output current satisfying the second relationship is smaller than the product of the output voltage and the output current satisfying the first relationship.

18. The control method of claim 15, wherein providing the switching control signal based on the regulation signal further comprises:
  generating an output voltage reference based on a target voltage and the regulation signal, wherein the output voltage reference varies with the change of the regulation signal; and
  providing the switching control signal based on the output voltage reference and the output voltage.

19. The control method of claim 15, wherein providing the switching control signal based on the regulation signal further comprises:
  generating a maximum output current reference based on a maximum target current and the regulation signal, wherein the maximum output current reference varies with the change of the regulation signal; and
  providing the switching control signal based on an output voltage reference, the maximum output current reference, the output voltage and the output current.

20. The control method of claim 15, wherein providing the output energy based on the output voltage and the output current further comprises:
  providing the output energy by integrating a product of the output voltage and the output current within a time period.

* * * * *